(12) United States Patent
Heintjes

(10) Patent No.: US 8,746,614 B2
(45) Date of Patent: Jun. 10, 2014

(54) SYSTEM FOR ACTUATING AT LEAST ONE POSITIONING FLAP OF AN AIRCRAFT AND A METHOD FOR MONITORING THE SYSTEM

(75) Inventor: Mark Heintjes, Weyhe (DE)

(73) Assignee: Airbus Operations GmbH, Hamburg (DE)

( * ) Notice: Subject to any disclaimer, the term of this patent is extended or adjusted under 35 U.S.C. 154(b) by 158 days.

(21) Appl. No.: 12/811,244

(22) PCT Filed: Dec. 30, 2008

(86) PCT No.: PCT/EP2008/011151
§ 371 (c)(1),
(2), (4) Date: Jun. 30, 2010

(87) PCT Pub. No.: WO2009/083261
PCT Pub. Date: Jul. 9, 2009

(65) Prior Publication Data
US 2010/0282899 A1    Nov. 11, 2010

Related U.S. Application Data

(60) Provisional application No. 61/017,730, filed on Dec. 30, 2007.

(30) Foreign Application Priority Data

Dec. 30, 2007    (DE) .......................... 10 2007 063 157

(51) Int. Cl.
*B64C 13/38*    (2006.01)
*B64C 9/14*    (2006.01)

(52) U.S. Cl.
USPC ......................... 244/99.3; 244/75.1; 244/99.2

(58) Field of Classification Search
USPC ....................... 244/194, 213, 198, 99.2, 99.3; 701/29.1, 29.7, 30.5; 318/3, 362, 366; 188/1.11 E; 192/223–223.4
See application file for complete search history.

(56) References Cited

U.S. PATENT DOCUMENTS 3,618,880 A  *  11/1971  Hagaman et al. .............. 244/113
3,662,550 A       5/1972  Lichtfuss
(Continued)

FOREIGN PATENT DOCUMENTS

DE    10313728 A1    10/2004
EP     1803644 A2     7/2007
(Continued)

OTHER PUBLICATIONS

International Search Report for corresponding PCT application PCT/EP08/011151, dated Jul. 21, 2009.
(Continued)

*Primary Examiner* — Joseph W Sanderson
*Assistant Examiner* — Marc Burgess
(74) *Attorney, Agent, or Firm* — Ingrassia Fisher & Lorenz P.C.

(57) ABSTRACT

A method for actuating at least one positioning flap on each wing of an aircraft, which positioning flap is actuated by at least two flap coupling devices each including a flap actuator device, where at least on one flap actuator device for each positioning flap a brake mechanism is arranged by means of whose actuation an adjustment state of the respective flap actuator device can be locked, including the steps of: actuating each brake mechanism of a positioning flap individually, subsequently actuating the flap actuator device by means of the drive motor, in the case of a change in the adjustment state of the positioning flap by a predetermined extent, terminating actuation of the positioning flap concerned, and a system for implementing the method.

17 Claims, 1 Drawing Sheet

(56) References Cited

U.S. PATENT DOCUMENTS

| | | | |
|---|---|---|---|
| 4,521,060 A | 6/1985 | Linton | |
| 5,719,566 A | 2/1998 | Readman et al. | |
| 5,845,975 A * | 12/1998 | Wells | 244/110 A |
| 6,684,623 B2 * | 2/2004 | Langston et al. | 244/110 B |
| 7,011,185 B2 * | 3/2006 | Kramer | 188/1.11 L |
| 7,048,234 B2 * | 5/2006 | Recksiek et al. | 244/213 |
| 7,191,642 B2 * | 3/2007 | Paulsen et al. | 73/121 |
| 7,556,224 B2 | 7/2009 | Johnson | |
| 2003/0192747 A1 * | 10/2003 | Borugian | 188/1.11 E |
| 2004/0200928 A1 * | 10/2004 | Degenholtz et al. | 244/75 R |
| 2005/0151027 A1 | 7/2005 | Recksiek | |
| 2005/0151028 A1 * | 7/2005 | Pohl et al. | 244/213 |
| 2006/0043242 A1 * | 3/2006 | Benson | 244/175 |
| 2006/0175153 A1 * | 8/2006 | Hubbard et al. | 188/1.11 E |
| 2006/0289696 A1 * | 12/2006 | Hanlon et al. | 244/35 R |
| 2007/0080261 A1 | 4/2007 | Carl et al. | |
| 2007/0145180 A1 * | 6/2007 | Johnson et al. | 244/13 |
| 2007/0179006 A1 * | 8/2007 | Kachouh | 475/154 |
| 2010/0044518 A1 | 2/2010 | Fleddermann et al. | |

FOREIGN PATENT DOCUMENTS

| | | |
|---|---|---|
| WO | 9800334 | 1/1998 |
| WO | 2005047108 A | 5/2005 |
| WO | 2007068413 A | 6/2007 |

OTHER PUBLICATIONS

International Preliminary Report on Patentability and Written Opinion for corresponding PCT application PCT/EP08/011151, dated Aug. 10, 2010.

* cited by examiner

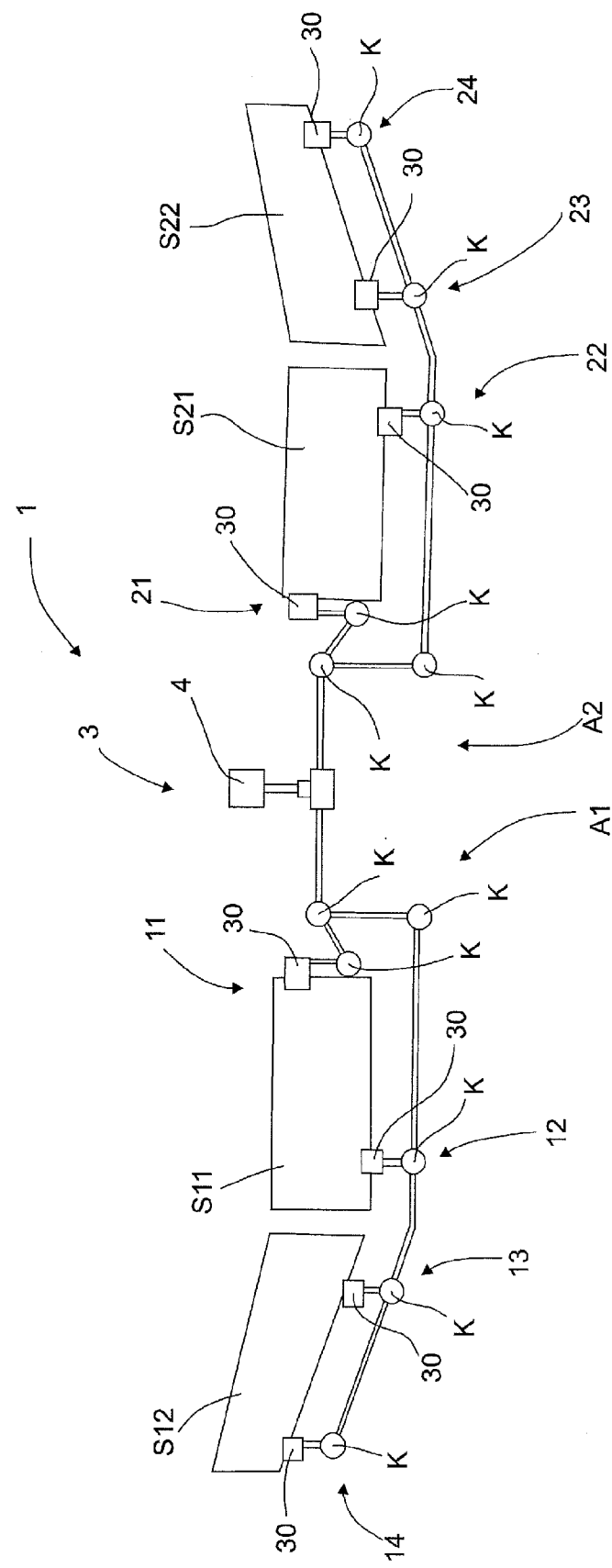

SYSTEM FOR ACTUATING AT LEAST ONE POSITIONING FLAP OF AN AIRCRAFT AND A METHOD FOR MONITORING THE SYSTEM

CROSS REFERENCE TO RELATED APPLICATIONS

This application claims priority to PCT Application No. PCT/EP2008/011151, filed Dec. 30, 2008; which claims priority to German Patent Application No. DE 10 2007 063 157.1, filed Dec. 30, 2007, and claims the benefit to U.S. Provisional Patent Application No. 61/017,730, filed Dec. 30, 2007, the entire disclosures of which applications are hereby incorporated by reference.

BACKGROUND

The invention relates to a system for actuating at least one positioning flap on each wing of an aircraft, and to a method for monitoring the flap actuating system. The invention relates in particular to a high-lift system for actuating at least one high-lift flap on a wing of an aircraft, and to a method for monitoring the high-lift flap actuating system.

Document WO 2007/068413 describes a method and device for providing automatic load alleviation to a high lift surface system of an aircraft.

From the general state of the art it is known that the individual high-lift surfaces, also referred to as leading-edge slats, or trailing-edge flaps, are adjusted by means of a system comprising a central motor. In this arrangement the central motor drives a drive shaft that extends along the wing, which drive shaft transmits the driving torque to the individual flap actuators and to the leading-edge slats or to the trailing-edge flaps.

In this arrangement the high-lift system can be designed in such a manner that predetermined errors that occur in the system can be compensated for without this compromising the safety of the aircraft. To this effect, in particular, the installation of brakes and sensors for error detection, and/or secondary structural elements are provided in order to hold the high-lift surfaces in a defined position. If two actuators are coupled to an positioning flap, and if each actuator comprises an individual load path, then in order to compensate for any structural failure of one of the two actuators the respective other actuator can lock the high-lift surface in its position at that time. If several positioning flaps on the same wing are adjusted in each case with two actuators, each comprising an individual load path, a secondary flap connecting strut can be provided which couples the two high-lift flaps in such a manner that if an actuator of a positioning flap fails, the positioning flap is held by the respective other positioning flap, by way of this flap connecting strut, so that the load of the defective positioning flap is transferred to the adjacent positioning flap.

In this high-lift system the secondary flap connecting strut forms a second load path in case of failure of an actuator, i.e. in case the actuator is defective. In normal operation the system is kept in position in the central drive by means of brakes. If, for example, a transmission shaft suffers a fracture, the system is stopped by the wingtip brakes positioned on the outside of the right-hand wing and the left-hand wing.

SUMMARY OF THE INVENTION

It is the object of the invention to provide a system for actuating at least one positioning flap of an aircraft, and a method for monitoring the flap actuating system, by means of which system the safety of a flap actuating system can be improved in an efficient manner.

This object is met by the characteristics of the by way of one or more embodiments disclosed and described herein.

However, the invention generally applies to positioning flaps of an aircraft, and also to systems in which power transfer to the positioning flaps takes place hydraulically or electrically and preferably by way of a central motor. There is a design requirement according to which no individual fault must result in the failure of an actuator.

Generally speaking, in the system according to the invention and in the method according to the invention it can be provided for the positioning flaps to be able to be controlled and actuated by a system drive device and a system drive device independently of each other. In this case, in a system comprising two positioning flaps for each wing, it can be provided for said positioning flaps to be controlled and actuated by the system drive device and the system drive device irrespective of each other, in particular for the inner landing flap to be able to be moved independently of the outer landing flap, and for the outer positioning flap to be able to be moved independently of the inner positioning flap.

In this arrangement actuation of the flaps can take place, for example, by means of electrically controlled servo actuators and actuating cylinders coupled thereto, which are driven by way of a hydraulics system.

According to the invention it is also possible to provide a mechanical drive transmission device, in particular in the form of a drive shaft, for transmitting the output of the drive motor to flap actuator devices, and to provide a coupling mechanism between the drive transmission device and the positioning flap, hereinafter referred to as a "flap coupling device". In this arrangement the system can be designed in such a manner that it comprises at least one positioning flap which can be controlled by means of the flap actuating system according to the invention, and that it can compensate for a fault in the coupling mechanism between the drive shaft, which extends from the central motor along the wing, and the positioning flap, hereinafter referred to as the "flap coupling device", independently, i.e. so as to be mechanically decoupled, from any other positioning flap.

The positioning flaps of the system according to the invention and of the method according to the invention can, in particular, be high-lift flaps.

The invention provides a solution in particular for the case in which no secondary flap connecting strut is provided due to system requirements, for example the ability to set various angles of attack of various flaps of a wing.

A central aspect of the method according to the invention for actuating at least one positioning flap on each wing of an aircraft relates to the evaluation of the functionality and/or to the reconfiguration and/or error compensation of a system for actuating at least one positioning flap. The positioning flap of at least two flap coupling devices is actuated by means of a flap actuator device, wherein at least on one flap actuator device for each positioning flap a brake mechanism is arranged by means of whose actuation an adjustment state of the respective actuator device can be locked. In order to evaluate the functionality and/or to reconfigure the positioning flap, in particular the following steps are provided for:

actuating each brake mechanism of a positioning flap individually, subsequently actuating the actuator device by means of the drive motor, in the case of a subsequent change in the adjustment state of the positioning flap by a predetermined extent, allocating the "defective" state to the flap coupling devices coupled to the positioning flap, and/or terminating actuation of the positioning flap concerned.

As a result of allocating the "defective" state, an evaluation of the functionality of the positioning flap, including the flap coupling devices and flap actuator device associated with said positioning flap, takes place. As a result of terminating actuation of the positioning flap concerned, reconfiguration of the positioning flap also takes place.

The method is, in particular, provided for a system according to the invention for actuating at least one positioning flap on each wing of an aircraft. The following can additionally be provided in the method:

in the case of a non-defective state of the flap coupling devices of a positioning flap, activating each brake mechanism, comparing a target command for the drive motor with the adjustment state measured by means of the drive state sensor, and in the case of a differential being exceeded, terminating actuation of the positioning flap concerned.

Furthermore, in the method according to the invention the following additional steps can be provided:

carrying out a comparison for determining the difference between the desired brake operation state commanded at a brake mechanism, and the determined brake operation state, in the case of a predetermined differential occurring on a brake mechanism, allocating the "defective" state to the flap coupling devices of a positioning flap, and/or terminating actuation of the positioning flap concerned.

Furthermore, according to the invention a system for actuating at least one positioning flap on each wing of an aircraft is provided, with the system comprising:

at least two flap coupling devices, each comprising a actuator device, with each of said flap coupling devices being coupled to the positioning flap in each case in one of two regions that are spaced apart from each other when viewed in the wingspan direction, a brake mechanism on at least one flap actuator device for each positioning flap, by means of actuation of which brake mechanism an adjustment state of the respective actuator device can be locked, a system drive device with a drive motor, drive transmission devices that couple the drive motor to the actuator devices in order to transmit the output of the drive motor to the actuator devices, and with a drive state sensor for determining an adjustment state of the drive motor, a brake intervention sensor that is arranged on at least one brake mechanism of a positioning flap for determining the intervention state of the brake mechanism, a control device with a control function for transmitting command signals to the system drive device and for commanding desired brake intervention states to the brake mechanisms, with a device for receiving signals of the sensor devices of the actuator devices and with a reconfiguration function.

The reconfiguration function comprises, in particular, a function by means of which each brake mechanism of a positioning flap can be actuated, or all the brake mechanisms associated with a positioning flap can be actuated individually; subsequently the flap actuator device is actuated by means of the drive motor, and, if a change in the adjustment state by a predetermined extent has been detected by means of the drive state sensor, allocates the "defective" state to flap coupling devices coupled to the positioning flap, or to the brake mechanisms.

In the system the control device can be set in such a manner that the positioning flap comprising a brake mechanism that already has been accorded the "defective" state is no longer controlled or actuated.

The drive transmission devices can comprise a control function for controlling each flap actuator device, and can comprise an electrical or hydraulic coupling of the drive motor for transmitting the drive output.

In this arrangement the drive transmission devices can comprise drive shafts for mechanically coupling the drive motor to the flap actuator devices so that the actuating movement of the drive motor is transmitted mechanically, e.g. by way of drive shafts, to the coupled flap actuator devices. The reconfiguration function further comprises a function by means of which in the non-defective state each brake mechanism can be activated, and a comparison between a target command of the drive motor and the adjustment state measured by means of the drive state sensor is carried out, and if a difference is exceeded, control of the positioning flap concerned is terminated.

Furthermore, the reconfiguration function can comprise: a comparison function for determining the difference between the desired brake operation state commanded at a brake mechanism and the determined brake operation state, and can comprise an error identification function by means of which, in the case of a predetermined differential occurring on a brake mechanism, the "defective" state is allocated to said brake mechanism. In this arrangement the reconfiguration function can be such that if the "defective" state has been allocated to a brake mechanism, control of said brake mechanism is terminated. As an alternative or in addition, the reconfiguration function can be such that if the "defective" state has been allocated to a brake mechanism, control of the flap coupling device on the brake mechanism that is assessed to be defective is terminated.

In the above-mentioned variants of the system according to the invention, said system can be designed in such a manner that the flap actuators coupled to a positioning flap can be driven by the drive motor and can be controlled individually by the control device for actuating the positioning flap. Furthermore, it can be provided for the flap actuators coupled to a positioning flap to be driven as a group by the drive motor, i.e. for several flap actuators coupled to a positioning flap to be coupled to the drive motor.

Furthermore, the system according to the invention can be designed in such a manner that the flap actuator devices are driven by a central drive motor, wherein the drive transmission devices are drive shafts.

The brake intervention sensor can be integrated in the brake mechanism. In particular, the brake intervention sensor can be a proximity sensor for acquiring the distance between two braking means, e.g. two counter-acting brake discs, wherein one braking means is affixed to the flap, while the other braking means is affixed to the main wing.

The brake intervention sensor can be implemented by means of a sensor for acquiring an actuating movement and a brake actuation model that is functionally coupled to the aforesaid, for the purpose of determining the brake intervention state of the brake mechanism at that time.

In the exemplary embodiments of the system according to the invention one or several flap actuator devices can comprise two load paths or power transmission mechanisms for coupling the drive shaft to the positioning flap.

BRIEF DESCRIPTION OF THE DRAWINGS

Below, preferred exemplary embodiments of the invention are described with reference to FIG. 1, which shows:

a diagrammatic system view of an embodiment of a high-lift system according to the invention as an example of the flap actuating system according to the invention.

DETAILED DESCRIPTION OF THE INVENTION

FIG. 1 shows an exemplary embodiment of the invention, namely a high-lift system 1 for actuating two high-lift flaps on each of two main wings of an aircraft (not shown) by means of a system drive device 3 with a drive motor 4 and a control device for actuating the system drive device. According to the invention it is generally also possible to provide only one positioning flap for each wing, which positioning flaps are controlled by the central drive 3. In the embodiment shown, on each wing two positioning flaps S11, S12, S21, S22 are driven by a central drive 3. The control device can also be part of the system drive device. According to the illustration a total of four high-lift flaps S11, S12, S21, S22 as examples of positioning flaps are controlled by means of the actuating system according to the invention.

On each positioning flap S11, S12, S21, S22 at least two flap coupling devices 11, 12, 13, 14 are in each case coupled to a flap actuator device 30. In an arrangement of two flap coupling devices 11, 12, 13, 14 for each positioning flap, in each case one flap coupling device is coupled to the positioning flap S11, S12, S21, S22 on one of two regions of the positioning flap, which regions are spaced apart from each other when viewed in the wingspan direction. The drive transmission devices for transmitting the output of the drive motor 4 to the flap coupling devices 11, 12, 13, 14 are designed as drive shafts A1, A2. The drive shafts A1, A2 comprise several components that are coupled to coupling devices K or gear arrangement devices, e.g. in order to achieve longer transmission paths or directional changes along the wing, or in order to couple the drive shaft to the respective flap coupling device 11, 12, 13, 14.

The actuating system 1 shown comprises a system drive 3, for example in the form of a hydraulic motor that drives a drive shaft A1, A2 that extends to each wing. Each drive shaft A1, A2 connects the system drive 3 to flap coupling devices that convert the rotary movement of the drive shaft to an actuating movement for adjusting the flap. The embodiment shown in FIG. 1 provides on the first side for two flap coupling devices 11, 12 for actuating the first flap S11, and for a further two flap coupling devices 13, 14 for actuating the second flap S12 between the first drive shaft A1 and the flaps S11 or S12. Furthermore, on the second side two flap coupling devices 21, 22 for actuating the first flap S21, and a further two flap coupling devices 23, 24 for actuating the second flap S22 are provided between the second drive shaft A2 and the flaps S21 or S22. The flap coupling device transmits the rotary movement of the respective drive shaft A1, A2 to a corresponding adjustment movement of the flap.

According to the invention, at least one positioning flap S11, S12 or S21, S22 is provided for each wing; in the exemplary embodiment shown two positioning flaps for each wing are in each case driven by two flap coupling devices. To this effect each flap coupling device comprises a flap actuator device 30. The drive shaft A1, A2 can be connected directly to the flap actuator device, or it can be connected to the flap actuator device 30 by way of a coupling mechanism (not shown). Furthermore, the flap actuator device 30 can be coupled to the flap S11, S12, S21, S22 by way of an actuating mechanism 33.

Furthermore, at least one of the flap coupling devices 11, 12, 13, 14 coupled to a positioning flap S11, S12, S21, S22 comprises a brake mechanism (not shown) which when it is actuated locks an adjustment state of the respective positioning flap. In particular, each flap coupling device 11, 12, 13, 14 can thus comprise such a brake mechanism.

The system according to the invention, for actuating at least one positioning flap on each wing of an aircraft, also comprises:
  at least two flap coupling devices 11, 12, 13, 14; 21, 22, 23, 24 each comprising a flap actuator device 30, in each case one flap coupling device being coupled to the positioning flap S11, S12, S21, S22 on one of two regions of the positioning flap, which regions are spaced apart from each other when viewed in the wingspan direction,
  a brake mechanism on at least one flap actuator device 30 for each positioning flap, by means of whose actuation an adjustment state of the respective flap actuator device 30 can be locked,
  a system drive device 3 with a drive motor 4, drive transmission devices A1, A2 that couple the drive motor 4 to the flap actuator devices 30 in order to transmit the output of the drive motor 4 to the flap actuator devices 30, and with a drive state sensor for determining an adjustment state of the drive motor 4,
  a brake intervention sensor that is arranged on at least one brake mechanism of a positioning flap for determining the intervention state of the brake mechanism,
  a control device with a control function for transmitting command signals to the system drive device 3 and for commanding desired brake intervention states to the brake mechanisms, with a device for receiving signals of the sensor devices of the flap actuator devices.

The control device furthermore comprises a reconfiguration function.

The system according to the invention also comprises a control device for commanding the desired adjustment states of the positioning flap, which control device comprises: a control function for transmitting command signals to the system drive device 3 and for commanding desired brake intervention states to the brake mechanisms; a device for receiving signals of the sensor devices of the flap actuator devices; and the reconfiguration function.

The flap actuator device 30 can be designed as a single load-path flap actuator or as a double load-path flap actuator.

The double load-path actuator can, in particular, be designed in such a manner that a first load path is implemented as a power transmission mechanism that following an actuation of the drive transmission devices A1, A2 transmits their movements to the positioning flap, wherein in this arrangement the power transmission mechanism can, for example, be designed as a gear arrangement. Furthermore, a second load path can be designed as a mechanical feedback device from the positioning flap to the respective drive transmission device A1, A2, so that in the case of a failure of the first load path there still exists a mechanical coupling between the positioning flap and the respective drive transmission device A1, A2, and so that the positioning flap remains mechanically coupled to the main wing. Failure of an actuator can be determined, as a result of the detection of a change in the adjustment state, by a predetermined extent or beyond a predetermined extent by means of the drive state sensor and by means of the reconfiguration function. The determination of a change in the adjustment state can, in particular, also be used for the determination of asymmetrical, different, changes in the adjustment state, i.e. changes that exceed a predetermined value, in the drive transmission devices of different wings. As an alternative it can also be provided for such a defect to be determinable by a sensor device that in this region is arranged on the positioning flap or on the drive transmission device.

The double load-path flap actuator can be designed as a gear arrangement with a double load path, in particular in the form of a ball screw. As far as the installation space is concerned it can be advantageous to design it as a rotatory gear arrangement with a double load path. The rotatory gear arrangement with a double load path can, in particular, comprise two identical gear arrangements, wherein one gear arrangement is provided as a secondary gear arrangement that follows the movement of the other gear arrangement as a primary gear arrangement. In this arrangement it is important that during normal operation the secondary gear arrangement does not take up any load. This can be implemented in that the secondary gear arrangement is given a defined extent of play. Other embodiments of the double load-path flap actuator can also be used for the flap actuator device.

With the use of the double load-path flap actuator in the system according to the invention, said system can, in particular, be designed in such a manner that the reconfiguration function actuates the brake mechanism and locks the positioning flap in its actuating position at that time, when a defect in the flap coupling device concerned or in the flap actuator device concerned is determined.

With the design of the flap actuator device as a flap actuator device comprising a single load-path flap actuator or as a flap actuator device comprising a double load-path flap actuator, the flap actuator device can comprise a torque locking device that is allocated to the brake mechanism, which torque locking device determines when no torque is present at the input to the gear arrangement. The control device can be functionally connected to the torque locking device in such a manner that in the case of the non-presence of a torque, in particular during adjustment of a drive transmission device, the brake mechanism is activated so that a torque locking function or a "no-back" function is activated. In this arrangement this torque locking function is designed as a brake mechanism that holds the gear arrangement or the flap actuator device in position. This torque locking function is preferably designed in such a manner that it can lock in both directions of rotation. As an alternative or in addition, the gear arrangement can comprise a torque limiting function that is provided in such a manner that the brake is actuated if a predetermined or set torque is exceeded.

As an alternative the flap actuator device 30 can be designed in such a manner that both actuators actively transmit the actuating movement of the drive shaft to the positioning flap so that in the case of a defect or failure of one of the actuators the other actuator can on its own take over the actuation function of the flap actuator device 30 in relation to the respective positioning flap. A defect in one of the actuators that is actively effective in parallel in one of the actuator devices can, for example, also take place by determining the above-mentioned asymmetrical changes in the adjustment state, or, as an alternative or in addition, by means of a sensor device that is arranged in this region on the positioning flap or on the drive transmission device.

The control device can be set in such a manner that, when the above-mentioned deviations from sensor values occur, the "defective" state is allocated to the flap coupling devices 11, 12, 13, 14 coupled to the positioning flap, or to the brake mechanisms. In addition or as an alternative it can be provided for the positioning flap concerned to no longer be actuated.

The reconfiguration function according to the invention comprises a function by means of which each brake mechanism of a positioning flap can be actuated individually; subsequently the flap actuator device can be actuated by means of the drive motor, and, if a change in the adjustment state has been determined by means of the drive state sensor by a predetermined extent, allocates the "defective" state to the flap coupling devices 11, 12, 13, 14 coupled to the positioning flap or to the brake mechanism, or the system treats the brake mechanism as being defective. In this manner this process-related step or this function results in a performance test of the brake mechanism concerned. In other words a brake mechanism or several or all brake mechanisms that are coupled to a positioning flap are actively actuated, and subsequently the drive motor 4 is operated. When in this arrangement by way of a sensor device a change in the adjustment state above a predetermined desired value is determined by means of the reconfiguration function, this means that the brake mechanism does not perform adequately, e.g. due to wear and tear, and can no longer carry out its allocated safety function of locking the positioning flap. In this arrangement the sensor device can be the sensor device on the system drive device, in other words the drive state sensor, or a sensor device in a region of the drive transmission device, which region is remote thereof. Preferably, a brake device is individually tested in the manner described.

By providing this test the integrity of the system can be significantly improved with relatively little mechanical expenditure. Furthermore, by means of the measure according to the invention the structure can be of a more lightweight design because the system can be designed in such a manner that, if the performance test is provided, achieving a desired integrity does not require consideration of the case of a fault in which the brake mechanism fails.

According to the invention, furthermore, a functional test of the flap actuator device can be provided. To this effect the reconfiguration function can furthermore comprise a comparison function for determining the difference between the desired brake operation state commanded at a brake mechanism and the determined brake operation state, and can comprise an error identification function by means of which, if a predetermined difference at a brake mechanism occurs, the "defective" state is allocated to said brake mechanism. According to the invention, this function test can be carried out more frequently. For example, the system according to the invention can be equipped for this function test to be carried out prior to each flight.

According to the invention, the brake operation state can be determined by means of a brake intervention sensor, which is, for example, integrated in the brake mechanism. In particular, the brake intervention sensor can be a proximity sensor for acquiring the distance between two braking means, e.g. two counter-acting brake discs, wherein one braking means is affixed to the flap, while the other braking means is affixed to the main wing. As an alternative or in addition, the brake intervention sensor can be implemented by a sensor for acquiring an actuating movement and a brake actuation model that is functionally coupled to the aforesaid for the purpose of determining the brake intervention state of the brake mechanism at that time.

The control device comprises a device for transmitting command signals to the flap actuator devices for actuating the flap actuator devices and the respectively associated brake mechanism for actuating the brake mechanism. By actuating the flap actuator devices the adjustment state of the positioning flap to which the flap actuator device is coupled is changed, in other words the positioning flap is retracted or extended. In order to retract or extend the positioning flap as intended, both or all the flap actuator devices that are coupled to the respective positioning flap are to be actuated at the same time by the control device such that the flap actuator devices move the positioning flap to the intended orientation vis-á-vis the main wing.

In particular if drive transmission devices A1, A2 in the form of drive shafts have been provided for mechanically coupling the drive motor to the flap actuator devices, the reconfiguration function can, furthermore, comprise a function by means of which in the non-defective state each brake mechanism can be activated, and a comparison between a target command of the drive motor 4 and the adjustment state measured with the drive state sensor is carried out, and if a difference is exceeded, control of the positioning flap concerned is terminated.

The system according to the invention with the control device can comprise flap actuator devices with a single load path or with a double load path. Furthermore, the system can comprise a combination of flap actuator devices, used on a positioning flap or within the system, with a single and double load path. According to the invention, active testing of the system thus takes place in such a manner that, if a flap actuator device with a double load path is provided, the availability of the second load path can be monitored.

According to the invention, it is possible to do without the use of sensor devices, and in particular position sensors, on the flap for the purpose of fault detection, while at the same time still meeting the usual requirements relating to integrity. Moreover, it is no longer necessary to provide an element such as the interconnection strut. Likewise, it is possible to do without the use of wingtip brakes. In addition, relatively complex monitoring algorithms can be done without because the reconfiguration function according to the invention is of a relatively simple design. However, on at least one flap actuator device of a positioning flap a brake intervention sensor is to be provided.

In order to improve the integrity of the system according to the invention, said system can comprise sensor devices, wherein in each case one of them is arranged in the region of the positioning flap and/or of the drive transmission devices, which regions are spaced apart from each other in the wingspan direction relative to the fuselage, for the purpose of determining an adjustment state. In this arrangement the adjustment state can, in particular, be a change in the adjustment state of the positioning flap or of the drive transmission couplings or of the drive transmission devices. Furthermore, further sensor devices for acquiring the position of one or several positioning flaps can also be provided and can be functionally coupled to the control device. In this arrangement this sensor information can be used for determining a change in the adjustment state of the positioning flap or of the drive transmission couplings or of the drive transmission devices, instead of or in addition to the informations determined by the drive state sensor of the system drive device 3. This can be provided in particular in those cases where the drive transmission devices A1, A2 comprise drive shafts for mechanical coupling of the drive motor to the flap actuator devices. With the use of sensor devices in the regions of the positioning flap and/or of the drive transmission devices, which regions are spaced apart from each other in the wingspan direction relative to the fuselage, instead of the drive state sensor, allocation of the "defective" state to the respective flap coupling devices 11, 12, 13, 14 or to the brake mechanisms takes place by means of the changes in the adjustment state determined by means of these sensor devices.

LIST OF REFERENCE CHARACTERS

1 System
3 System drive device
4 Drive motor
11 Flap coupling device
12 Flap coupling device
13 Flap coupling device
14 Flap coupling device
21 Flap coupling device
22 Flap coupling device
23 Flap coupling device
24 Flap coupling device
30 Actuator device
A1 First drive transmission device or first drive shaft
A2 Second drive transmission device or second drive shaft
S11 Inner positioning flap of the first wing
S12 Outer positioning flap of the first wing
S21 Inner positioning flap of the second wing
S22 Outer positioning flap of the second wing
K Coupling device

The invention claimed is:

1. A method for actuating at least one positioning flap on each wing of an aircraft, which positioning flap is actuated by at least two flap coupling devices each comprising a flap actuator device, wherein a brake mechanism is arranged at least on one flap actuator device for each positioning flap such that activation of the brake mechanism causes a position of the respective flap actuator device to be locked, the method comprising the steps of:
   actuating each brake mechanism of the at least one positioning flap individually to cause the position of the respective flap actuator device to be locked,
   subsequently actuating the actuator device by means of a central drive motor,
   terminating actuation of the flap actuator device of the at least one positioning flap when a change in the position of the at least one positioning flap meets or exceeds a predetermined extent, and
   sensing an intervention state of the brake mechanism to determine whether the brake mechanism has caused the respective flap actuator device to be locked.

2. The method according to claim 1, further comprising:
   activating each brake mechanism when a non-defective state of the flap coupling devices of the at least one positioning flap exists,
   comparing a target command for the central drive motor with the position measured by means of a drive state sensor, and
   terminating actuation of the at least one positioning flap when a difference between the target command and the measured position exceeds the predetermined extent.

3. The method according to claim 1, further comprising:
   determining a difference between a commanded brake interventions state and the determined brake intervention state, and
   terminating actuation of the flap actuator device of the at least one positioning flap when a difference between the commanded brake interventions state and the determined brake intervention state meets or exceeds a predetermined differential.

4. A system for actuating at least one positioning flap on each wing of an aircraft, the system comprising:
   at least two flap coupling devices, each comprising a flap actuator device, with each of said flap coupling devices being coupled to the positioning flap in regions that are spaced apart from each other when viewed in a wingspan direction of the aircraft,
   a brake mechanism on at least one flap actuator device of each positioning flap, such that activation of the brake mechanism causes a position of the respective flap actuator device to be locked, a system drive device with a drive motor, drive transmission devices that couple the drive motor to the flap actuator devices in order to transmit an output of the drive motor to each of the flap actuator devices, and with a drive state sensor for determining a position of the drive motor, a brake intervention sensor that is arranged on at least one brake mechanism of a positioning flap for measuring an intervention state of the brake mechanism, the intervention state being whether the brake mechanism has caused the respective flap actuator device to be locked, and a control device with a control function for transmitting command signals to the system drive device and for commanding desired brake intervention states to the brake mechanisms, with a device for receiving signals of sensor devices of the flap actuator devices, wherein the control device includes a reconfiguration function that operates such that: (i) each brake mechanism of the at least one positioning flap are actuated individually to cause the position of the respective flap actuator device to be locked; (ii) subsequently the flap actuator devices are actuated by means of the central drive motor, and (iii) a defective state is allocated to at least one of the flap coupling devices of the at least one positioning flap and the brake mechanisms of the at least one positioning flap, when the control devices determines one or more predetermined differences between the position of the drive motor determined by the drive state sensor and the signals from the sensor devices of the flap actuator devices, or between the commanded desired brake intervention states and the measured intervention states of the brake mechanisms by the brake intervention sensor.

5. The system according to claim 4, wherein the control device is set in such a manner that actuation of the at least one positioning flap is terminated when the defective state is allocated.

6. The system according to claim 4, wherein the drive transmission devices comprise a control function for controlling each flap actuator device, and comprise an electrical or hydraulic coupling of the drive motor for transmitting the drive output.

7. The system according to claim 4, wherein the drive transmission devices comprise drive shafts for mechanically coupling the drive motor to the flap actuator devices, and the reconfiguration function operates such that in a non-defective state each brake mechanism can be activated, and a comparison between a target command of the drive motor and of the position measured by means of the drive state sensor is carried out, and if a difference is exceeded, control of the at least one positioning flap is terminated.

8. The system according to claim 4, wherein the reconfiguration function furthermore comprises a comparison function for determining a difference between the desired brake intervention state commanded at a brake mechanism and the determined brake intervention state, and comprises an error identification function by means of which, in the case of a predetermined differential occurring with respect to the brake mechanism, the defective state is allocated to said brake mechanism.

9. The system according to claim 8, wherein if the defective state has been allocated to a brake mechanism, control of said brake mechanism is terminated.

10. The system according to claim 8, wherein if the defective state has been allocated to a brake mechanism, control of the flap coupling device associated with the brake mechanism that is assessed to be defective is terminated.

11. The system according to claim 4, wherein the actuators coupled to the at least one positioning flap are driven by the drive motor and are controlled individually by the control device for actuating the at least one positioning flap.

12. The system according to claim 4, wherein the actuators coupled to the at least one positioning flap are driven as a group by the drive motor.

13. The system according to claim 4, wherein the actuator devices are driven by a central drive motor, wherein the drive transmission devices are drive shafts.

14. The system according to claim 4, wherein the brake intervention sensor is integrated in the brake mechanism.

15. The system according to claim 4, wherein the brake intervention sensor is a proximity sensor for acquiring a distance between two braking elements of the brake mechanism.

16. The system according to claim 4, wherein the brake intervention sensor comprises a sensor for acquiring actual movement of one or more elements of the brake mechanism and a brake actuation model of theoretical movement of the one or more elements of the brake mechanism for the purpose of determining the brake intervention state of the brake mechanism at a given time.

17. The system according to claim 4, wherein the flap actuator device comprises two load paths for coupling the drive shaft to the positioning flap.

* * * * *